United States Patent
Morita et al.

(10) Patent No.: US 6,769,823 B2
(45) Date of Patent: Aug. 3, 2004

(54) FUSION SPLICING METHOD AND DEVICE FOR OPTICAL FIBERS

(75) Inventors: Sachie Morita, Chiba (JP); Takeshi Sato, Chiba (JP); Hiroshi Sato, Chiba (JP); Hiroshi Sugawara, Chiba (JP)

(73) Assignee: Fujikura Ltd., Tokyo (JP)

( * ) Notice: Subject to any disclaimer, the term of this patent is extended or adjusted under 35 U.S.C. 154(b) by 45 days.

(21) Appl. No.: 10/187,962

(22) Filed: Jul. 3, 2002

(65) Prior Publication Data

US 2003/0007755 A1 Jan. 9, 2003

(30) Foreign Application Priority Data

Jul. 5, 2001 (JP) ........................................ 2001-204749
Jul. 13, 2001 (JP) ........................................ 2001-214463

(51) Int. Cl.$^7$ .............................................. G02B 6/255
(52) U.S. Cl. ........................ 385/96; 219/383; 385/134; 385/137
(58) Field of Search .................................. 385/134, 147, 385/96–98, 114, 95; 219/124.1, 124, 139, 383, 200

(56) References Cited

U.S. PATENT DOCUMENTS 2,756,308 A  * 7/1956 Powell ........................ 219/57
5,296,679 A  * 3/1994 Suzuki et al. ................ 219/383
5,481,640 A  * 1/1996 Harman et al. .............. 385/147
6,336,750 B1 * 1/2002 Clark et al. .................... 385/96

FOREIGN PATENT DOCUMENTS

JP         3-229206       10/1991
JP      2000-098170       4/2000

* cited by examiner

Primary Examiner—David V. Bruce
Assistant Examiner—Krystyna Suchecki
(74) Attorney, Agent, or Firm—Oblon, Spivak, McClelland, Maier & Neustadt, P.C.

(57) ABSTRACT

In a fusion splicing method and device for ribbon optical fibers, bare fibers (I) of the ribbon optical fibers are arranged, in opposite direction to each other, on a fiber setup stage (10) having V-grooves. A discharge occurs between the discharge electrode rods (21,22). In order to set all of the bare fibers "f" into a uniform temperature area in a discharge area, a wide and length of the uniform temperature area is extended by applying to the discharge area an electric field generated by applying a desired voltage to fiber clamps (31) made up of a conductive material. Thereby, a good fusing and splicing process is performed by supplying a uniform amount of heat to all of the bare fibers "f". Further, the above process is also performed while a desired voltage is applied to a conductive plate arranged under the fiber setup stage (10).

13 Claims, 7 Drawing Sheets

FUSION SPLICING METHOD AND DEVICE FOR OPTICAL FIBERS

CROSS-REFERENCE TO RELATED APPLICATION

This application is based upon and claims the benefit of priority from the prior Japanese Patent Applications No.P2001-204749, filed on Jul. 5, 2001 and No.P2001-214463, filed on Jul. 13, 2001; the entire contents of which are incorporated herein by reference.

BACKGROUND OF THE INVENTION

1. Field of the Invention

The present invention relates to a fusion splicing method and device for optical fibers, specifically, ribbon optical fibers (having a tape-shaped structure) capable of obtaining a good splice state of the ribbon optical fibers by fusing and splicing the ribbon optical fibers with an approximately uniform amount of heat applied to all of bare fibers of the ribbon optical fibers.

2. Description of the Related Art

In a fusing and splicing process for optical fibers, specifically, ribbon optical fibers having a tape-shaped structure, the bare fibers (which are distal ends of the optical fibers, each bare fiber is made up of a core and a clad where a coated material has been eliminated) to be spliced together are arranged and aligned, in opposite direction to each other, on a V-groove block in a fiber setup stage. Then, an aerial discharge (arc discharge) is generated between a pair of electrode rods. The bare fibers of the ribbon optical fibers are thereby fused and spliced together. This is called the fusing splicing method.

In the fusing and splicing method, when the width of the ribbon optical fibers (of a tape-shaped structure) is large, it becomes difficult to heat all of the bare fibers at a uniform temperature. This causes dispersion of the spliced optical fibers.

Figure 1:
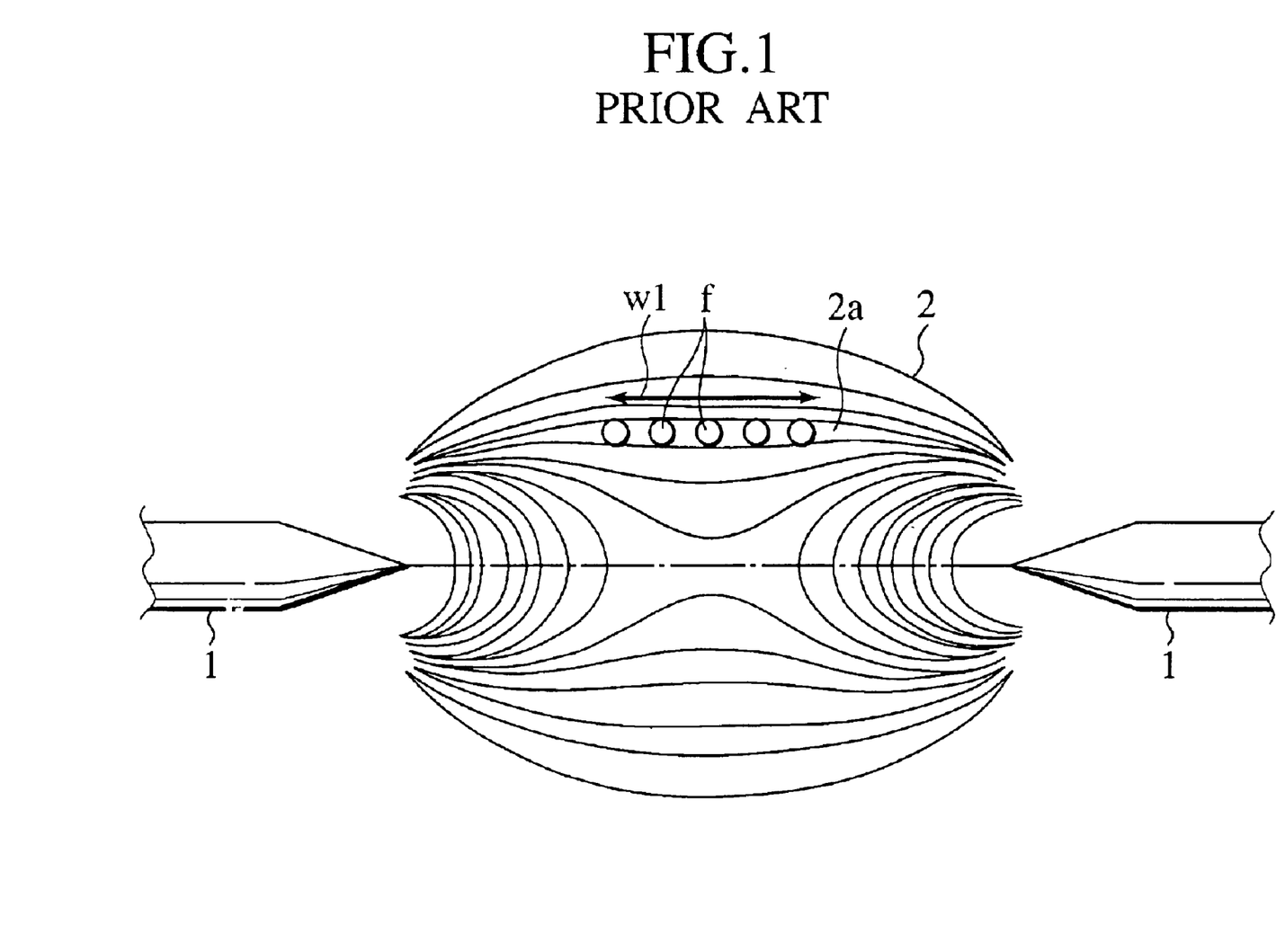
FIG. 1 is a diagram showing a schematic explanation for an example of a distribution of an aerial discharge under a normal condition in a related art.

Dispersion of the spliced optical fibers occurs for the following reason. For example, as shown in FIG. 1, when an arc discharge occurs between a pair of the discharge electrode rods 1 in the atmosphere under a normal condition, the temperature distributions in the upper and lower haves of a discharge area 2 have a symmetrical shape, and a rapid temperature change occurs around the electrode rods 1. The width W1 (or a length) of a region 2a, which is separated in position from a pair of the discharge electrode rods 1 and where the change of the temperature is relatively uniform, does not become long.

This problem does not occur when the number of the bare fibers in a ribbon optical fiber is relatively small. However, when this number is large (for example, when the number is not less than twenty-four) it becomes difficult to set the entire of the bare fibers "f" of the ribbon optical fibers into the uniform temperature region 2a. This means it is difficult to perform a uniform heating for all of the cores in the ribbon optical fiber.

In such a case where a variation of the heating temperature happens, a lack of the holding strength occurs in the spliced part between the optical fibers or a splice loss occurs at the spliced part in the ribbon optical fibers.

In order to eliminate the drawbacks described above included in the related art, the following technique has been disclosed in the Japanese patent publication No. H03-229206 in which a magnetic field applying means of a complicated structure is mounted in the device, and it generates and applies a magnetic field to an arc-discharge region between the discharge electrode rods. The temperature distribution in the arc-discharge is thereby controlled so that all of the bare fibers of ribbon optical fibers to be spliced are heated uniformly. The optical fibers of the ribbon optical fibers are spliced together.

However, the magnetic field applying means in the above related art has following drawbacks.

First, it is necessary to install one or more additional coils of a relatively large size for generating the magnetic field around the discharge electrode rods. It is further necessary to mount a power source means for applying electric power to those coils. This causes the device to become a complicated structure, the manufacturing cost of the device becomes high, and the entire size of the device becomes large.

Furthermore, there is a possibility that the electrode rods erroneously discharge around the coils of the magnetic generation means. Moreover, it is necessary to install a shield means for eliminating erroneous operation of the device because the coils generate a strong magnetic field.

Further, the generation of the magnetic field in the coils increases the power consumption of the device.

SUMMARY OF THE INVENTION

Accordingly, an object of the present invention is, with due consideration to the drawbacks of the related art, to provide a fusion splicing method and device for optical fibers, specifically, ribbon optical fibers, having an electric potential applying section of a simple configuration, for example having a fiber clamp function, mounted on a fiber setup stage in which bare fibers of the ribbon optical fibers are set, or having an electric potential applying section comprising a conductor plate of a simple configuration and the like under the fiber setup stage. Thereby, the method and device can control a distribution of the discharge optimally, and can heat all of the bare fibers of the ribbon optical fibers with an approximately uniform temperature, and can splice the both ribbon optical fibers precisely and completely.

In order to achieve the above object of the present invention, there is provided a fusion splicing method for optical fibers having following steps, arranging bare fibers of ribbon optical fibers, in opposite direction to each other and to be spliced together, on a fiber setup stage, generating an electric field by applying a voltage to an electric potential applying section mounted on the fiber setup stage, and fusing and splicing the bare fibers together by controlling that all of the bare fibers are set in a uniform temperature area in a discharge area generated by a discharge between a pair of discharge electrode rods and by applying the electric field to the discharge area.

According to an embodiment, a fusion splicing device for optical fibers has a fiber setup stage on which ribbon optical fibers to be spliced are arranged in opposite direction to each other, an electric potential applying section for generating an electric field, arranged on the fiber setup stage, having a function of fiber clamps to clamp the ribbon optical fibers, and made up of a conductive material, and a pair of discharge electrode rods for generating a discharge in order to fuse and splice bare fibers of the ribbon optical fibers on the fiber setup stage. In the device, in order to fuse and splice the ribbon optical fibers together, the electric field is generated by controlling a voltage to be applied to the electric potential applying section according to the number of the bare fibers of the ribbon optical fibers so that all of the bare fibers are set in a uniform temperature area in the discharge area obtained by the discharge.

Still further, according to an embodiment, a fusion splicing method for optical fibers has following steps, arranging corresponding bare fibers of ribbon optical fibers, in opposite direction to each other, to be spliced together on a fiber setup stage, generating an electric field by applying a voltage to an electric potential applying section mounted under the fiber setup stage, and fusing and splicing the bare fibers together by controlling that all of the bare fibers are set in a uniform temperature area in a discharge area generated by a discharge between a pair of discharge electrode rods and by applying the electric field to the discharge area.

Still further, according to an embodiment, a fusion splicing device for optical fibers has a fiber setup stage on which ribbon optical fibers to be spliced are arranged in opposite direction to each other, an electric potential applying section for generating an electric field, arranged under the fiber setup stage, and a pair of discharge electrode rods for generating a discharge in order to fuse and splice bare fibers of the ribbon optical fibers on the fiber setup stage. In the device, in order to fuse and splice the ribbon optical fibers together, the electric field is generated by controlling a voltage to be applied to the electric potential applying section according to the number of the bare fibers of the ribbon optical fibers so that all of the bare fibers are set in a uniform temperature area in the discharge area obtained by the discharge.

The above and other features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Other features of the present invention will become apparent through the following description of various embodiments which are given for illustration of the invention and are not intended to be limiting thereof.

First Embodiment

Figure 2:
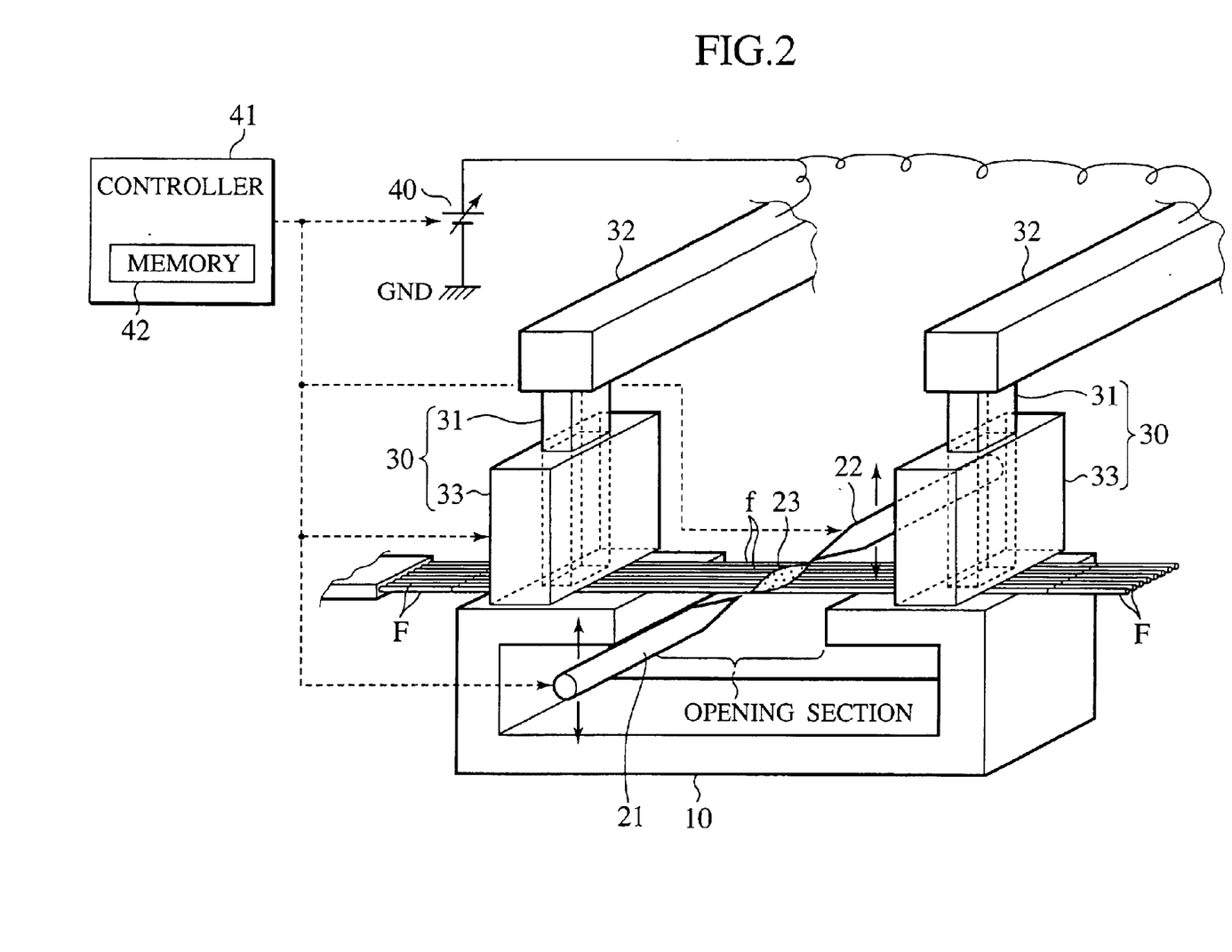
FIG. 2 is a schematic perspective diagram showing an example of a fusion splicing device performing a fusion splicing method for ribbon optical fibers according to a first embodiment.

FIG. 2 is a schematic perspective diagram showing an example of a fusion splicing device performing a fusion splicing method for ribbon optical fibers according to the first embodiment.

In FIG. 2, the reference number 10 designates a fiber setup stage having a rough "C"-shaped block body. Both corresponding upper surfaces (right section and left section) of the fiber setup stage 10 have a plurality of V-grooves. The reference numbers 21 and 22 denote a pair of electrode rods arranged at an opening section in the fiber setup stage 10. The reference number 30 indicates a pair of electric potential applying sections having a fiber clamp function, which are also used as fiber clamps, each made up of an electric conductor mounted on the upper surface side in the fiber setup stage 10.

Each of a pair of the electric potential applying sections 30 comprises a fiber clamp 31 made up of an electric conductor (such as a metal), and an insulating coating material attached to or applied to the fiber clamp 31.

In the configuration of the first embodiment shown in FIG. 2, although the fiber clamps 31 are electrically connected to a variable voltage power source 40 through supporting arms 32 made up of a conductive material, it is also possible to connect the fiber clamps 31 to the power source 40 through electrical wirings.

A plurality of the bare fibers "f" of the ribbon optical fibers "F" to be spliced together are arranged, and aligned in opposite direction to each other, with a desired interval on the fiber setup stage 10. The bare fibers of the ribbon optical fibers to be spliced are clamped by the fiber clamps 31 on the fiber setup stage 10.

In this state, a discharge occurs between a pair of the discharge electrode rods 21, 22, and a desired voltage is applied to both the fiber clamps 31 from the variable voltage power source 40 (It is also acceptable to use a power source of a fixed voltage. This is effective through the following description.).

A plurality of V-grooves (whose number corresponds to at least the number of optical fibers forming a ribbon optical fiber) is formed on the upper surface of the fiber setup stage 10. Those V-grooves are omitted from FIG. 2.

Figure 3:
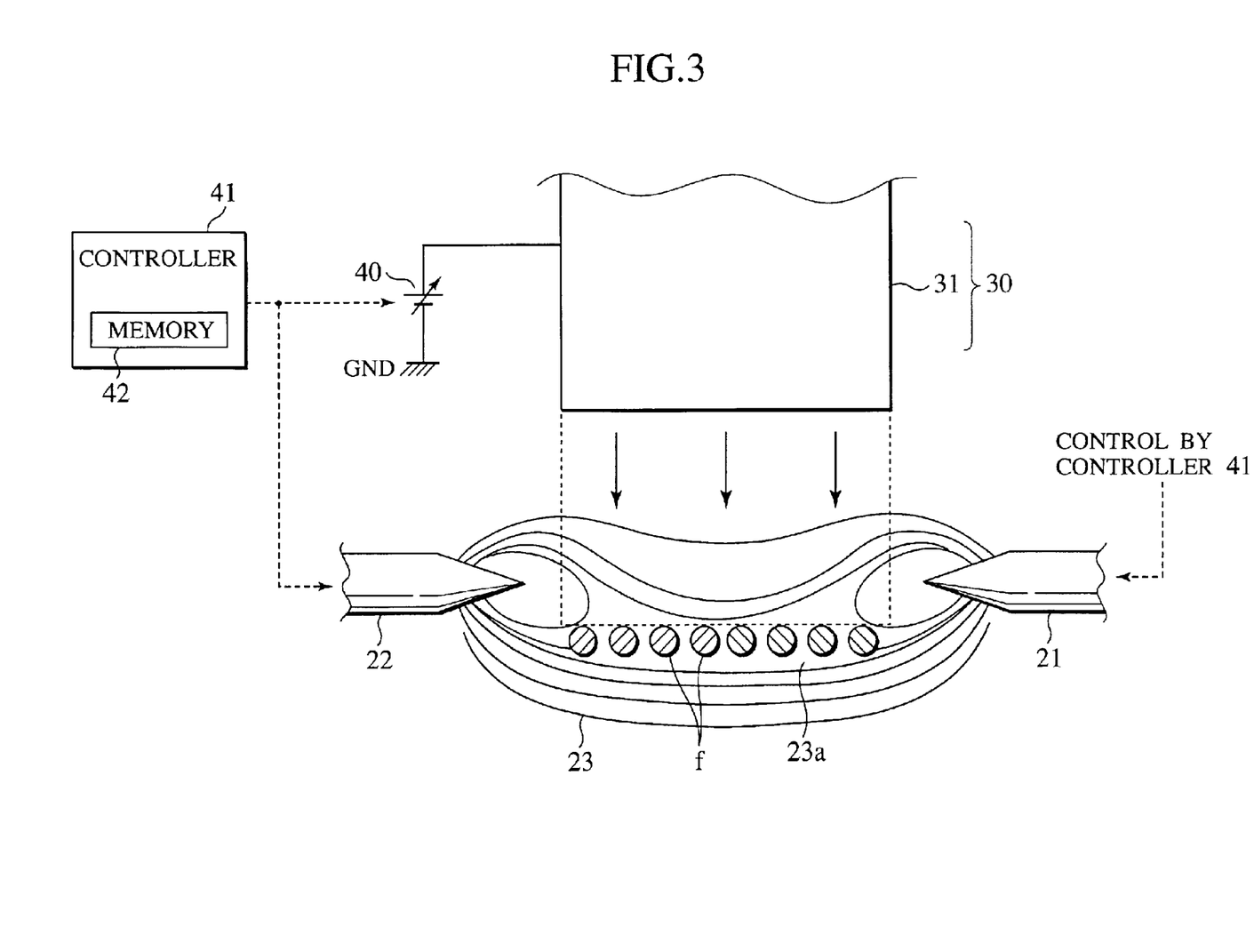
FIG. 3 is a schematic diagram showing a distribution of a discharge area generated when a voltage is applied to an electric potential applying section in the fusion splicing device shown in FIG. 2.

As shown in FIG. 3, the density distribution of the discharge area 23 between the discharge electrode rods 21 and 22 is controlled by an electric potential generated by the fiber clamps 31. The electric potential has been generated by applying a desired voltage to the electric potential applying sections 30. A relatively wide and long uniform temperature area 23a is thereby formed in a part of the density distribution of this discharge.

Because the arrangement of the fiber clamps 31 are close to the discharge area 23, not just above this area 23, an action caused by an electric field can be obtained effectively. Accordingly, when each bare fiber "f" is set in the discharge area 23, each bare fiber "f" can be fused with an approximately optimum uniform temperature.

After this fusion process, corresponding bare fibers of the ribbon optical fibers are spliced together completely and precisely. The fusion splicing process is thereby completed.

In order to completely set each of the bare fibers "f", it is possible to optionally adjust the magnitude of the voltage, the height of the discharge electrode rods, and the discharge voltage corresponding to the number of the bare fibers.

For example, the optimum voltage is determined in advance according to the number of optical fibers, and the data about the optimum voltage is stored in the memory 42. Next, the optimum voltage is read from the memory 42 according to the number of optical fibers to be spliced, and the driver 41 indicates the optimum voltage to the variable voltage power source 40.

The controller 41 can be comprised of a microcomputer, an operation panel for inputting the data of the number of optical fibers, and a memory.

As described above in detail, because the fusion and splicing process for ribbon optical fibers is performed at an approximately uniform temperature, it is possible to obtain a good spliced state of both the ribbon optical fibers having no variation of the spliced state, an adequately spliced state between corresponding bare fibers, and a lower transfer loss.

Further, because the present invention can obtain an electrical field only by applying an optimum voltage to both the fiber clamps 31, negligible electric power is therefore required for the generation of the electrical field.

Figure 4:
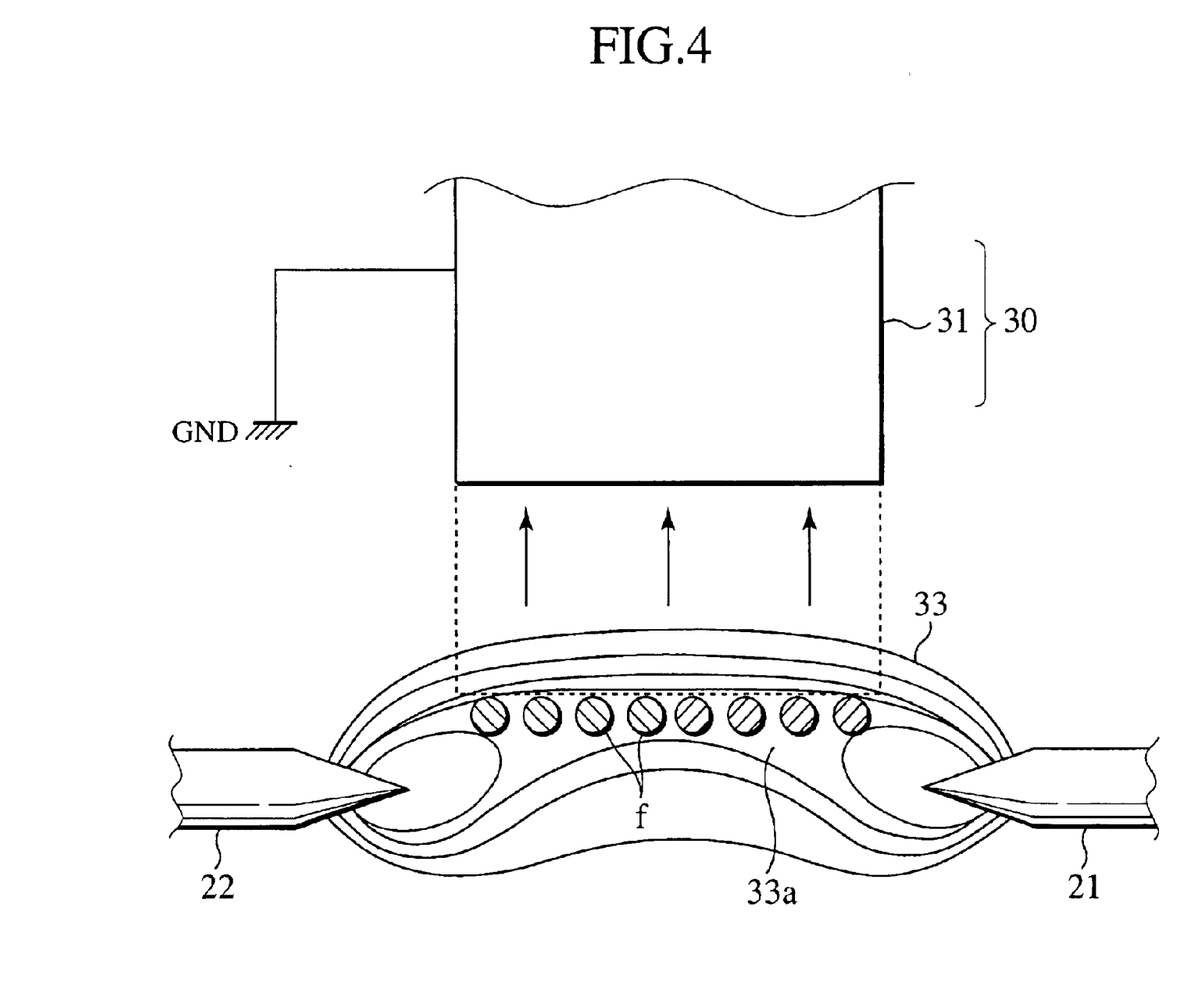
FIG. 4 is a schematic explanatory diagram showing a distribution of a discharge area generated when a ground potential is applied to the electric potential applying section in the fusion splicing device shown in FIG. 2.

In addition to the above case where a positive voltage is applied to the fiber clamps 31, it is also possible to apply a ground potential shown in FIG. 4 or a negative potential (not shown) to the fiber clamps 31. In those cases, a relative wide and long uniform temperature area 33a, as show in FIG. 4, can be obtained, like the uniform temperature area 23a shown in FIG. 3. Although those cases obtain the discharge area 33 that is different in shape from the discharge area 23 shown in FIG. 3, as a result, it is possible to obtain approximately same action and effect of the case shown in FIG. 3.

In the above embodiment, because the ribbon optical fibers are set and clamped to the V-grooves in the fiber setup stage 10, the present invention is not limited by this configuration, for example, it is also possible to prepare a "C"-shaped block and a V-groove block on which the V-grooves are formed as separated components, and to combine the V-groove block to the "C"-shaped block in use. This embodiment can obtain the same effect.

Further, in the above examples, in order to obtain a simple configuration, although the electric potential applying sections 30 have the function of the fiber clamps 31, the present invention is not limited by this configuration. For example, it is also possible to form the electric potential applying sections 30 of a conductive material as an independent component from the fiber clamp mechanism.

Thus, according to the fusion splicing method and device of the present invention for ribbon optical fibers, because it is possible to supply uniform and adequately amount of heat to bare fibers of the ribbon optical fibers to be spliced, it is possible to obtain a good splice state of the ribbon optical fibers with high and stable reliability without variation of the spliced state of the optical fibers.

In addition, according to the present invention, because the electric potential applying section 30 having the function of the fiber clamp is arranged on the fiber setup stage 10, it is possible to prevent an increase in the configuration and complication around the discharge electrode rods 21 and 22 in the device.

In addition, because the electric potential applying section 30 is arranged at an optimum interval to the discharge electrode rods 21 and 22, it is possible to prevent an occurrence of coherency caused between the discharge area and the electric potential applying section.

Further, because the electric potential applying section 30 in the fusion splicing device of the present invention has a simple configuration, it is easily possible to incorporate it into available devices.

Moreover, because the electric potential applying section 30 is made up of only a conductor, it is possible to manufacture it at a low manufacturing cost. Of course, it is possible to incorporate the electric potential applying section 30 into available devices at a low cost.

In addition, because an optimum voltage or a ground voltage is applied to the electric potential applying section 30 in the present invention, there is no significant increase in the power consumption. When a variable power source is used as the voltage power source to the electric potential applying section, it is possible to adjust and control the discharge area over a wide range.

Moreover, when the electric potential applying section 30 includes a function of the fiber clamps, it is possible to easily clamp optical fibers to be spliced. This configuration can lead the miniaturization of the device and can manufacture the fusion splicing device in a small size.

Furthermore, when the electric potential applying section 30 includes the function of the fiber clamps and an insulating coating material is attached to or applied around the fiber clamps, it is possible to prevent any occurrence of erroneous discharge in which the discharge generated between the electrode rods affects to the electric potential applying section 30 which generates the electric field. Therefore it is not necessary to install any additional shield material in the device in order to prevent any occurrence of the erroneous discharge.

Second Embodiment

Figure 5:
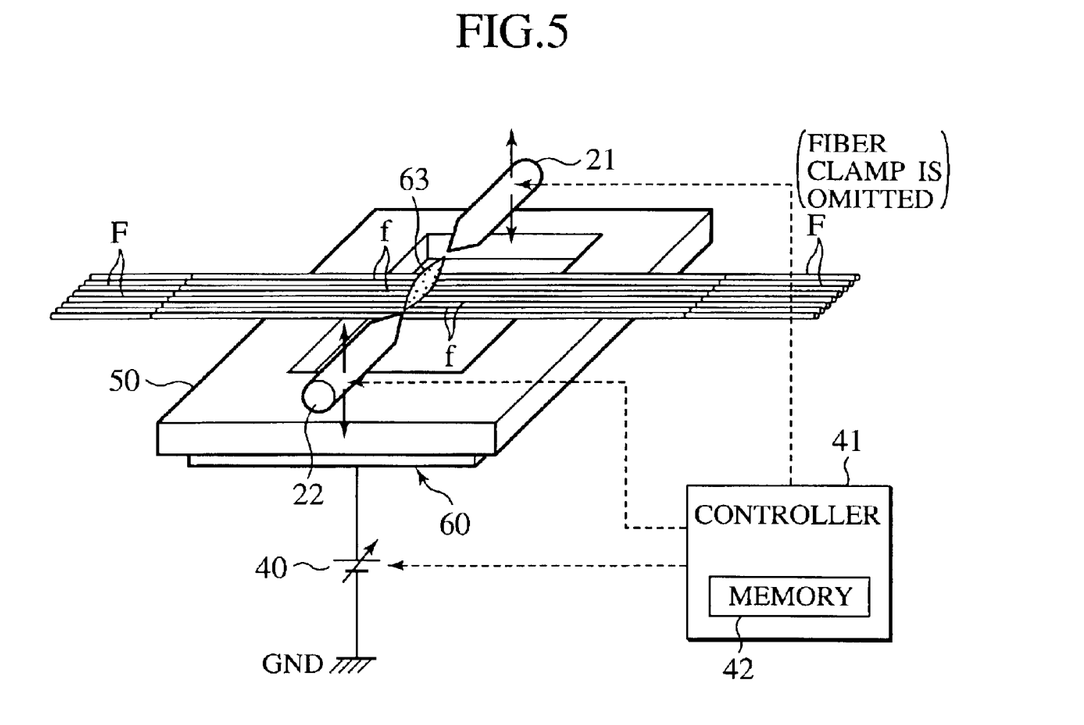
FIG. 5 is a schematic perspective diagram showing an example of a fusion splicing device performing a fusion splicing method for ribbon optical fibers according to a second embodiment.

FIG. 5 is a schematic perspective diagram showing an example of a fusion splicing device performing a fusion splicing method for ribbon optical fibers according to the second embodiment.

In FIG. 5, the reference number 50 designates a fiber setup stage (or a fiber holder) made up of a plate of a rectangular frame, the center section of which is an opening, and on the upper surface of the stage 50 a plurality of V-grooves are formed. The reference numbers 21 and 22 denote a pair of discharge electrode rods arranged over the fiber setup stage 50, and the reference number 60 indicates an electric potential applying section arranged under the fiber setup stage 50. In FIG. 5, fiber clamps for clamping bare fibers "f" in ribbon optical fiber, to be spliced together, on the fiber setup stage 50 are omitted.

Figure 6:
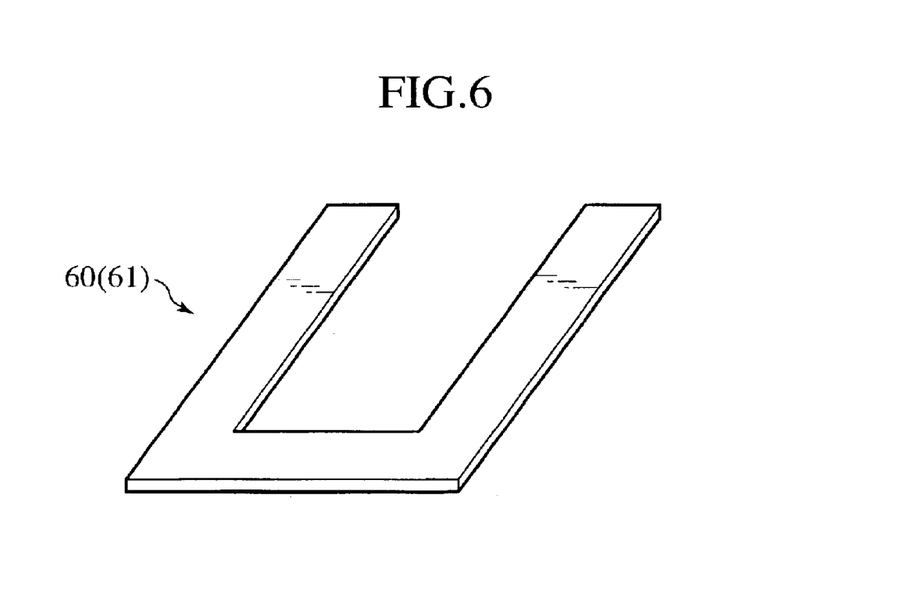
FIG. 6 is a schematic diagram showing an example of an electric potential applying section in the fusion splicing device shown in FIG. 5.

The electric potential applying section 60 is made up of a conductive plate 61 such as a metal plate having a "C"-shape, as shown in FIG. 6.

Over the fiber setup stage 50, a plurality of bare fibers "f" of the ribbon optical fibers to be spliced together are arranged, and aligned in opposite direction to each other, at a predetermined interval. In this state, the discharge occurs between a pair of the discharge electrode rods 21 and 22, and a desired voltage is applied to the conductive plate 61 such as a metal plate through the variable voltage power source 40 under the control of the controller 41.

On the upper surface of the fiber setup stage 50, a plurality of V-grooves (corresponding to at least the number of bare fibers forming the ribbon optical fibers) is formed.

Figure 7:
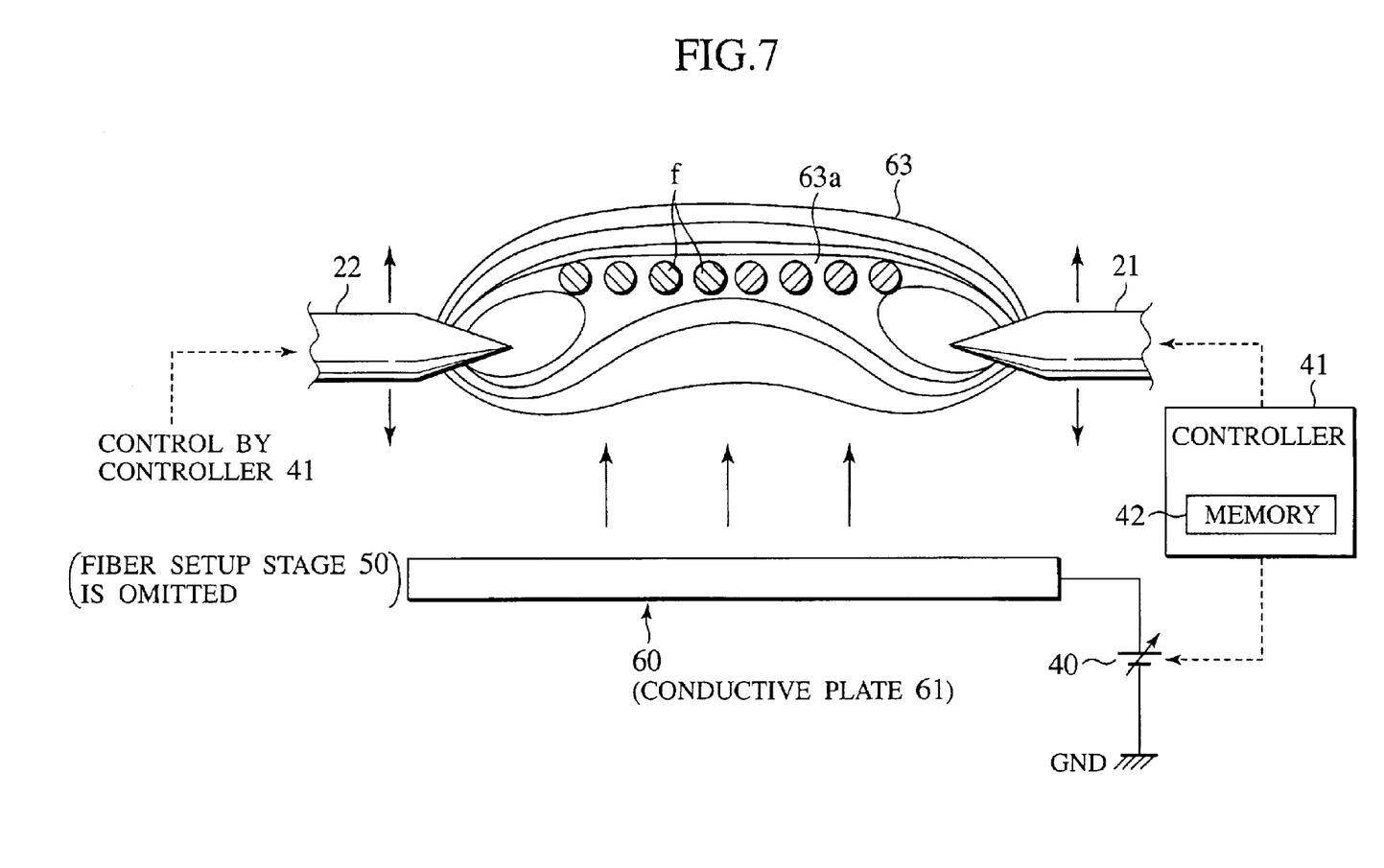
FIG. 7 is a schematic diagram showing a distribution of a discharge area generated when a voltage is applied to the electric potential applying section in the fusion splicing device shown in FIG. 5.

As described above, the density distribution of the temperature in the discharge area 63 between the discharge electrode rods 21 and 22 is controlled by the magnitude of the electric potential generated at the conductive plate 61, as shown in FIG. 7 (where the fiber setup stage 50 is omitted), through the combination of the discharge between the discharge electrode rods 21 and 22 and the desired voltage applied to the conductive plate 61 by the variable voltage power source 40. As a result, the relatively wide and long uniform temperature area 63a can be formed in the discharge area 63.

Because the conductive plate 61 is closed to the discharge area 63, not under the discharge area 63, it is possible to adequately obtain the effect caused by the electric field generated at the conductive plate 61.

Accordingly, each bare fiber "f" in the optical fibers to be spliced can be heated and thereby fused at an approximately uniform temperature after each bare fiber "f" is set in the uniform temperature area 63a. The fused bare fibers are then spliced together. The fusion splicing process is thereby completed.

In order to set all of the bare fibers "f" in the uniform temperature area 63a, it is possible to control a magnitude of the voltage applied to the conductive plate 61 through the variable voltage power source 40, a height of the discharge electrode rods 21 and 22, and a magnitude of the voltage causing the discharge between the electrode rods 21 and 22 under the control of the controller 41, and to adjust the shape of the conductive plate 61. It is also possible to change the distance between the discharge electrode rods 21 and 22 and the optical fibers "f" based on a magnitude of the voltage applied to the conductive plate 61. This may be done while arranging the fibers "f" on the stage 50, generating an electric filed by applying a voltage to conductive plate 61, and fusing the fiber "f" together.

For example, the optimum magnitude of the voltage corresponding to the number of bare fibers forming ribbon optical fibers are determined in advance, and the optimum magnitude of the voltage corresponding to the number of the bare fibers is then stored in the memory 42. Next, according to the number of bare fibers to be spliced, the data corresponding to the magnitude of the optimum voltage is read from the memory 42, and the optimum voltage is applied to the conductive plate 61 through the variable voltage power source 40 under the control of the controller 41. For example, the controller 41 can be comprised of a microcomputer, an operation panel for inputting the data of the number of bare fibers, and a memory.

As described above, because the splice process to fusion and splice bare fibers can be performed at an approximately uniform temperature, there is no variation of a splice state between the ribbon optical fibers, a strong splice state and a low transfer loss can be obtained. Thereby, a good splice state for the ribbon optical fibers can be obtained.

Further, because a desired voltage is applied only to the conductive plate 61 as the electric potential applying section 60, there is no significant increase in power consumption.

Figure 8:
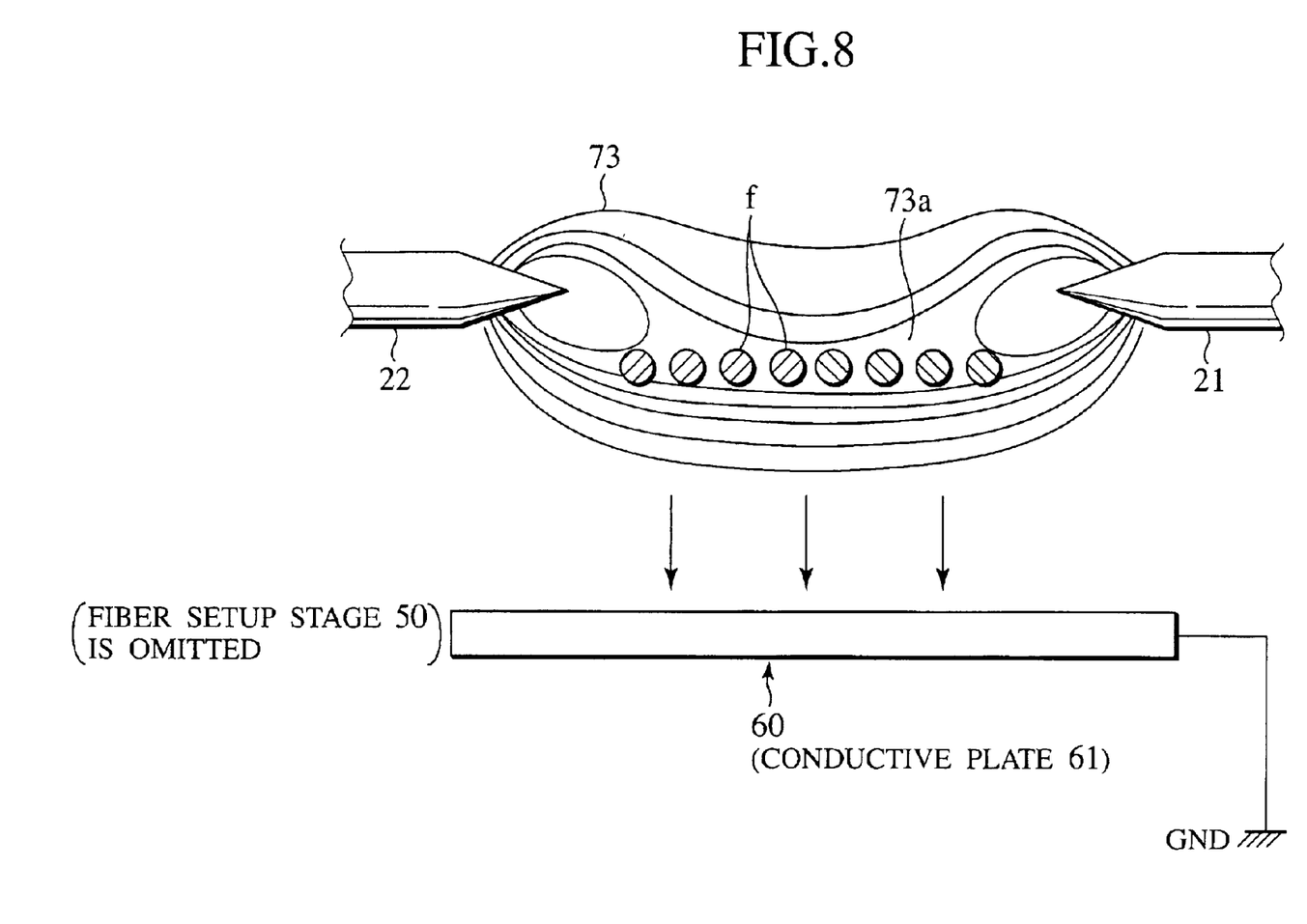
FIG. 8 is a schematic diagram showing a distribution of a discharge area when a ground potential is applied to the electric potential applying section in the fusion splicing device shown in FIG. 5.

In addition to the above case where a positive voltage is applied to the conductive plate 61, it is also possible to apply a ground potential (see FIG. 4) or a negative voltage (not shown) to the conductive plate 61, as shown in FIG. 8 (in which the fiber setup stage 50 is omitted). Although those cases obtain the discharge area 73 that is different in shape from the discharge area 63 shown in FIG. 7, as a result, it is possible to obtain a relative wide and long uniform temperature area 73a, like the uniform temperature area 63a shown in FIG. 7.

Although the second embodiment described above has shown that the ribbon optical fibers "F" are set in the V-grooves in the fiber setup stage 50, the present invention is not limited by this configuration, for example, it is also possible to prepare a plate as the fiber setup stage 50 and a V-groove block having V-grooves, and to combine them into one component. This case can obtain the same effect.

Furthermore, in the embodiment described above, although the distribution of the discharge area 63 is changed only by applying an optimum electric potential (namely, an optimum voltage) to the electric potential applying section 60, the present invention is not limited by this manner, for example, it is also possible to obtain a discharge area of a different distribution by properly changing various conditions such as the shape of the conductive plate 61, and the interval between the conductive plate 61 and both the discharge electrode rods 21 and 22.

In order to obtain the same effect in various cases, it is sufficient to generate a relatively wide and long uniform temperature area in a part of a discharge area by applying an optimum voltage to the electric potential applying section arranged under the fiber setup stage, and a plurality of bare fibers forming ribbon optical fibers to be spliced are thereby set in the uniform temperature area.

As set forth in detail, according to the fusion splicing method and device for ribbon optical fibers to be spliced, because the electric potential applying section can apply a uniform and optimum quantity of heat to all of the bare fibers of ribbon optical fibers to be spliced, it is thereby possible to obtain a stable splice state of the ribbon optical fibers with a high reliability and without any variation of the spliced state.

Furthermore, because a plate (for example, a rectangular plate or a "C"-shaped plate) can be used as the electric potential applying section and also arranged under the fiber setup stage, the surrounding area of the discharge electrode rods does not become complicated, as a result, the fusion splicing device does not become large in size, and it is possible to prevent any occurrence of a coherence between the electric potential applying means and the discharge.

In addition, because the electric potential applying section has a simple configuration, it is possible to easily install it in available fusion splicing devices.

Further, because the electric potential applying section can be made up of a conductive plate such as a metal plate, it is possible to make it with a low manufacturing cost. Of course, it is also possible to install it in available fusion splicing devices with a low fabrication cost.

Moreover, because the electric potential applying section is arranged under the fiber setup stage at a location at some distance from the discharge electric rods, no erroneous discharge happens between the electric potential applying section and the discharge area of the electrode rods. Further, it is not necessary to install any shield mechanism in order to eliminate an occurrence of the erroneous discharge caused by the electric field generated by the electric potential applying section.

Furthermore, because a direct current (D.C.) voltage or a ground voltage can be applied to the electric potential applying section, it is possible to avoid increasing the power consumption. The use of a variable power source as the voltage power source in order to apply the voltage to the electric potential applying has the advantage to control the discharge area with a wide range.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A fusion splicing method for optical fibers comprising:
   arranging bare fibers of ribbon optical fibers in opposite direction to each other on a fiber setup stage;
   generating an electric field by applying a voltage to an electric potential applying section mounted on the fiber setup stage; and
   fusing and splicing the bare fibers together by controlling that all of the bare fibers are set in a uniform temperature area in a discharge area generated by a discharge between a pair of discharge electrode rods and by applying the electric field to the discharge area;

wherein the electric field is generated by applying the voltage to fiber clamps for clamping the optical fibers on the fiber setup stage while using the fiber clamps as the electric potential applying section.

2. A fusion splicing method for optical fibers comprising:

arranging bare fibers of ribbon optical fibers in opposite direction to each other on a fiber setup stage;

generating an electric field by applying a voltage to an electric potential applying section mounted on the fiber setup stage; and fusing and splicing the bare fibers together by controlling that all of the bare fibers are set in a uniform temperature area in a discharge area generated by a discharge between a pair of discharge electrode rods and by applying the electric field to the discharge area;

wherein the fusing and splicing step is performed after a distance between the electric potential applying section and the discharge electrode rods are set according to a magnitude of the voltage applied to the electric potential applying section.

3. A fusion splicing method for optical fibers comprising:

arranging bare fibers of ribbon optical fibers in opposite direction to each other on a fiber setup stage;

generating an electric field by applying a voltage to an electric potential applying section mounted on the fiber setup stage; and fusing and splicing the bare fibers together by controlling that all of the bare fibers are set in a uniform temperature area in a discharge area generated by a discharge between a pair of discharge electrode rods and by applying the electric field to the discharge area;

wherein the arranging, generating, and fusing and splicing steps are performed while changing a distance between a pair of the discharge electrode rods and the optical fibers based on a magnitude of the voltage applied to the electric potential applying section.

4. A fusion splicing device for optical fibers comprising:

a fiber setup stage on which ribbon optical fibers to be spliced are arranged in opposite direction to each other;

an electric potential applying section for generating an electric field, arranged on the fiber setup stage, said electric potential applying section comprising fiber clamps to clamp the ribbon optical fibers, said electric potential applying section made up of a conductive material; and a pair of discharge electrode rods for generating a discharge in order to fuse and splice the bare fibers on the fiber setup stage, wherein in order to fuse and splice the ribbon optical fibers together, the electric field is generated by controlling a voltage to be applied to the electric potential applying section according to the number of the bare fibers so that all of the bare fibers are set in a uniform temperature area in the discharge area obtained by the discharge.

5. The fusion splicing device for optical fibers according to claim 4, further comprises a control section, including a memory for storing control data determined in advance according to the number of the optical fibers of the ribbon optical fibers, wherein the control section reads the control data from the memory according to the number of the optical fibers of the ribbon optical fibers, changes a position of the discharge electrode rods and applies the optimum voltage to the electric potential applying section based on the control data obtained from the memory.

6. The fusion splicing device for optical fibers according to claim 4, wherein the conductive material forming the electric potential applying section is earthed so that all of the bare fibers are set in the uniform temperature area.

7. The fusion splicing device for optical fibers according to claim 4, wherein the electric potential applying section comprises:
a pair of fiber clamps made up of a conductive material; and
an insulating material around the fiber clamps.

8. A fusion splicing method for optical fibers comprising:

arranging corresponding bare fibers of ribbon optical fibers, in opposite direction to each other, to be spliced together on a fiber setup stage;

generating an electric field by applying a voltage to an electric potential applying section mounted under the fiber setup stage; and fusing and splicing the bare fibers by controlling that all of the bare fibers are set in a uniform temperature area in a discharge area generated by a discharge between a pair of discharge electrode rods and by applying the electric field to the discharge area.

9. The fusion splicing method according to claim 8, wherein the fusing and splicing step is performed after a distance between the electric potential applying section and the discharge electrode rods is set based on a magnitude of the voltage to be applied to the electric potential applying section.

10. A fusion splicing device for optical fibers comprising:

a fiber setup stage on which ribbon optical fibers to be spliced are arranged in opposite direction to each other;

an electric potential applying section for generating an electric field, arranged under the fiber setup stage; and a pair of discharge electrode rods for generating a discharge in order to fuse and splice bare fibers of the ribbon optical fibers on the fiber setup stage, wherein in order to fuse and splice the ribbon optical fibers together, the electric field is generated by controlling a voltage to be applied to the electric potential applying section according to the number of the bare fibers so that all of the bare fibers are set in a uniform temperature area in the discharge area obtained by the discharge.

11. The fusion splicing device for optical fibers according to claim 10, further comprises a control section, including a memory for storing control data determined in advance according to the number of the optical fibers of the ribbon optical fibers, wherein the control section reads the control data from the memory according to the number of the optical fibers of the ribbon optical fibers, changes a position of the discharge electrode rods and applies the optimum voltage to the electric potential applying section based on the control data obtained from the memory.

12. The fusion splicing device for optical fibers according to claim 10, wherein the electric potential applying section is earthed so that all of the bare fibers are set in the uniform temperature area.

13. The fusion splicing device for optical fibers according to claim 10, wherein the electric potential applying section arranged under the fiber setup stage comprises a conductive plate.

* * * * *